United States Patent
Hamamoto

(10) Patent No.: US 7,917,329 B2
(45) Date of Patent: Mar. 29, 2011

(54) ELECTRONIC BALANCE

(75) Inventor: Hiroshi Hamamoto, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 12/162,049

(22) PCT Filed: Sep. 3, 2007

(86) PCT No.: PCT/JP2007/067131
§ 371 (c)(1),
(2), (4) Date: Jul. 24, 2008

(87) PCT Pub. No.: WO2009/031190
PCT Pub. Date: Mar. 12, 2009

(65) Prior Publication Data
US 2010/0228521 A1    Sep. 9, 2010

(51) Int. Cl.
*G06F 15/00* (2006.01)
*G01G 19/40* (2006.01)

(52) U.S. Cl. .................................. 702/173; 177/25.19

(58) Field of Classification Search .................. 702/173, 702/127; 177/25.19; 173/25.13, 25.19
See application file for complete search history.

(56) References Cited

U.S. PATENT DOCUMENTS
2004/0035611 A1* 2/2004 Honda et al. ............... 177/25.19
2006/0058975 A1* 3/2006 Hamamoto ................... 702/101

FOREIGN PATENT DOCUMENTS
JP     09-043041 A     2/1997
JP     2006-078410 A   3/2006

* cited by examiner

*Primary Examiner* — Bryan Bui
(74) *Attorney, Agent, or Firm* — Sughrue Mion, PLLC

(57) ABSTRACT

An electronic balance 1 is provided with a measured weight storage controlling portion 33 for storing measured weight in sequence, a measuring mode storing portion 42 for storing a number of measuring modes where different averaging parameters are preset, an input portion for a measuring mode 72 which carries out an input operation for selecting one measuring mode from among a number of measuring modes, and an average weight display controlling portion 31 for calculating the average weight by averaging the number of measured weight on the basis of the averaging parameter in the measuring mode and displays the average weight in a display portion 60, and is characterized in that the electronic balance is further provided with an input portion 71 for making a modification which carries out an input operation for making a modification on the averaging parameter in the selected measuring mode, and the average weight display controlling portion 31 calculates the average weight by averaging the number of measured weight on the basis of the averaging parameter where a modification is made and displays the average weight in the display portion 60.

10 Claims, 6 Drawing Sheets

ELECTRONIC BALANCE

BACKGROUND OF THE INVENTION

1. Technical Field

The present invention relates to an electronic balance, and in particular, an electronic balance which can measure an object by selecting an appropriate measurement mode (display conditions) in accordance with the state of the object to be measured, the task of measurement and the environment for the task.

2. Background Technology

In general electronic balances, the measured weight, which is gained by detecting the weight of an object, is in many cases affected by vibration when the object is placed on the measuring dish, or vibration from the outside caused by the surrounding environment, such as air flow or vibration in the floor. In the case where an object is measured under the influence of an air flow blown out from an air conditioner, for example, the balance shakes, due to the air flow from the air conditioner, and therefore, the measured weight keeps fluctuating over the duration of measurement.

Therefore, electronic balances having a windproof structure for preventing the electronic balance from being affected by air flow are disclosed (see for example Patent Document 1).

Meanwhile, electronic balances where fluctuation in the measured weight of an object is negated through an averaging process are also used. That is to say, electronic balances having an averaging function for repeatedly detecting the weight of the object and storing the measured weight in a buffer in sequence so that the measured weight, of which the number of samples is preset, from among the measured weight stored in the buffer, are averaged, and thus, the average weight is calculated and displayed on a display screen, have been developed.

In electronic balances having an averaging function, it is necessary to remove the weight measured in a vibrating state immediately after the object is placed on and removed from the measuring dish from the sampling data for the averaging process. Therefore, the threshold value of the fluctuation width of the measured weight for determining whether or not the object is in a vibrating state (hereinafter referred to as amount of fluctuation in weight for starting averaging) and the threshold value of the time during which the state where the fluctuation width of the measured weight is the amount of fluctuation in weight for starting averaging or lower (hereinafter referred to as stability continuing time) are set so that it can be determined whether or not the object is in a vibrating state from the relationship between the measured weight detected in sequence and the above described threshold values.

That is to say, when the amount of fluctuation in the weight which indicates chronographic change in the measured weight detected in sequence (weight fluctuation width) is determined to be the amount of fluctuation in weight for starting averaging or lower, and the time during which the state continues after the amount of fluctuation in the weight becomes the amount of fluctuation in weight for starting averaging or lower is determined to be longer than the stability continuing time or greater, and thus, it is determined that the object is in a "stable state," and in such a state that the averaging process is possible.

When the object is determined to be in a "stable state," the measured weight starts being used, and when a preset number of samples are gained for the measured weight, the average weight is calculated, and this calculated average weight is displayed on the display screen as the results of measurement of the "weight" of the object.

As described above, in the case where various types of vibration noise are included in the measured weight, the average weight is gained after the effects of the noise have subsided and the object becomes of a "stable state."

Incidentally, electronic balances having an averaging function use the measured weight of a preset number of samples in to calculate the average weight, and therefore, in the case where the preset number of samples is great, time is required before the average weight can be displayed on the display screen, and as a result, it takes time for the measurer to gain the average weight of the object. In contrast, in the case where the preset number of samples is small, the effects of averaging become small, and it becomes difficult to gain a stable average weight.

In addition, in the case where a desired amount is taken by adding (or removing) the object (for example powder or liquid) little by little, the value gained through the averaging process on the measured weight before and after a small amount is added or removed is displayed, unless the measured weight before and after the operation of adding or removing a small amount is removed from the averaging process. However, in the case where the amount of fluctuation in the weight becomes small as a result of the object being added or removed, the amount of fluctuation in the weight becomes a preset amount of fluctuation in weight for starting averaging or less, and the state continues for the stability continuing time or longer, and thus, an average weight resulting from inappropriate sampling is displayed.

Accordingly, it is desired for the averaging process to be adjusted so that the averaging process becomes appropriate for the situation in accordance with whether the object is light or heavy, the task of measurement (simple measurement of weight, gradual measurement) and the environment for the task. Therefore, electronic balances having an averaging function where a "measuring mode" in which the averaging process can be adjusted so that it is appropriate in accordance with the object, the measurement task and the environment for the task can be selected have been developed.

For example, a "standard measuring mode" is provided for an averaging process which is appropriate for general measurement, and a "gradual measuring mode" is provided for measuring a desired amount of an object by adding (or removing) a small amount of the object in sequence. For cases where it is necessary to carry out measurement in an environment where there is a lot of vibration from the outside, such as vibration in the floor, a "disturbance-proof mode" is additionally provided. Measuring modes other than these may be added.

In addition, such parameters as the number of samples required to be set when the averaging process is carried out, the amount of fluctuation in weight for starting averaging and the stability continuing time are provided with appropriate values for each measuring mode as "averaging parameters," and when the measuring mode is selected, the averaging process is carried out with the number of samples and the amount of fluctuation in weight for starting averaging and the stability continuing time.

As a result, when the number of samples set in standard measuring mode is used as a reference, selection of a measuring mode where a smaller number of samples is set makes the time for calculating the average weight shorter than the standard measuring mode, that is to say, makes the response of the average weight displayed faster, and therefore, the object can be placed on the measuring dish and removed quickly. In addition, when the amount of fluctuation in weight for starting averaging set in standard measuring mode is used as a reference, and a measuring mode where a smaller amount of fluctuation in weight for starting averaging is set is selected, the amount of fluctuation in the weight when the object is added or removed tends to be greater than the amount of fluctuation in weight for starting averaging in the case where a small amount of the object (for example powder or liquid) is added (or removed) in sequence, and thus, it can become difficult to start the averaging process during the process of adding or removing the object.

In the following, in order to make the description more simple, an electronic balance having an averaging function where two measuring modes: a "standard measuring mode" and a "gradual measuring mode," where the preset number of samples is different can be selected is described.

In an electronic balance having an averaging function as that described above, the average weight calculated through an averaging process is displayed on a display screen as the results of measurement of the "weight" of the object. At this time, it is required for the electronic balance to be in a "stable state," and at the same time, it is required for the response in gaining the results of measurement to be fast.

Here, "stability of the average weight" and "response of the average weight" in the electronic balance in a "stable state" are described.

The "stability of the average weight" improves as the set number of samples for calculating the average weight increases. However, when the number of samples is great, the time required before the average weight can be displayed on the display screen becomes long.

Meanwhile, in order to increase the "response of the average weight," the number of samples for calculating the average weight should be set as small as possible. However, when the number of samples becomes too small, the average weight easily fluctuates, due to failure to subdue the effects of various types of vibration noise.

That is to say, the "stability of the average weight" and the "response of the average weight" are inversely related by nature.

Therefore, two measuring modes (display conditions): "standard measuring mode," where the set number of samples is great, and "gradual measuring mode," where the set number of samples is small, are stored in advance in conventional electronic balances, taking the balance between the "stability of the average weight" and the "response of the average weight" into consideration. As a result, the user of the electronic balance selects either the "stability of the average weight" or the "response of the average weight" in accordance with the application and the environment for use in each case, and thus, measures the object.

Patent Document 1: Japanese Unexamined Patent Publication H9 (1997)-43041

DISCLOSURE OF THE INVENTION

Brief Summary of the Invention

Incidentally, the user of conventional electronic balances selects either "standard measurement mode" or "gradual measurement mode" so that the object to be measured can be measured.

Depending on the application and the environment for use, however, it might not be possible to set the mode to "standard measurement mode" or "gradual measurement mode," and sometimes "it may be desired for the response to be a little faster" than in "standard measurement mode" at the time, or sometimes "it may be desired for the stability to be higher, because the environment for use is poor." That is to say, instead of changing the "measurement mode" for adjusting the stability and responsiveness, which are objectively set in the electronic balance, the user may sometimes desire to change the stability and the response on the basis of the subjective stability and responsiveness they sense during measurement at the time.

Therefore, an object of the present invention is to provide an electronic balance in which the balance between the "stability of the average weight" and the "response of the average weight" can be freely set according to the user's sense.

Means for Solving Problem

The electronic balance provided according to the present invention in order to achieve the above described object is an electronic balance having; a measured weight storage controlling portion for detecting weight of an object in sequence and thus storing the detected measured weight in a measured weight storing portion in sequence; a measuring mode storing portion for storing a number of measuring modes where different averaging parameters are preset; an input portion for a measuring mode which carries out an input operation for selecting one measuring mode from among the number of measuring modes stored in the above described measuring mode storing portion; and an average weight display controlling portion for calculating average weight by averaging the number of measured weight stored in the above described measured weight storing portion on the basis of an average parameter in the selected measuring mode and displaying the average weight in a display portion, wherein the electronic balance further comprises an input portion for making a modification which carries out an input operation for making a modification in an average parameter in the selected measuring mode, and the above described average weight display controlling portion calculates the average weight by averaging a number of measured weight on the basis of the average parameter where a modification is made and displays the average weight in the display portion.

Here, "average parameter" means a value that is set to display the average weight gained by carrying out an averaging process on the measured weight in the display portion and is, for example, the number of samples, the amount of fluctuation in weight for starting averaging, or the time during which the stability continues.

Here, number of samples is the number of times the weight is measured, on the basis of which an averaging process is carried out. Accordingly, the greater the number of samples set is, the more "stability of the average weight" can be achieved, and the time required before the average weight is displayed in the display portion becomes longer as the number of samples increases. Meanwhile, the smaller the number of samples set is, the more "response of the average weight" can be achieved, but when the number of samples is small, the effects of various types of vibration noise cannot be subdued, and the average weight tends to easily fluctuate.

In addition, the amount of fluctuation in weight for starting averaging is a first threshold value of the width of fluctuation in the measured weight for determining whether or not a "stable state" has been achieved. Accordingly, the greater the amount of fluctuation in weight for starting averaging set is, the easier it is to determine that a "stable state" has been achieved, and as a result, "stability" of the measurement results displayed becomes easy to achieve, by displaying the average weight gained as a result of calculation of the stable average weight, but the time required before the average weight is displayed in order to calculate the average weight tends to be long. Meanwhile, the smaller the amount of fluctuation in weight for starting averaging set is, the more it is difficult to determine whether a "stable state" has been achieved, and as a result, the stable average weight is not displayed, and the "response" of the results of measurement to be displayed becomes easier to achieve, while it becomes more difficult to display an average weight where the effects of various types of vibration noise are subdued.

In addition, the time during which stability continues is a second threshold value of the time during which the state where the width of fluctuation in the measured weight becomes the amount of fluctuation in weight for starting averaging or lower continues. Accordingly, the longer the time during which the stability continues set is, the easier it becomes for the stability to be determined to be a "stable state," and as a result, it becomes easier to achieve "stability" in the results of measurement displayed, by displaying the average weight through calculation of the stable average weight, and the time required before the average weight is displayed tends to be long, because the average weight is calculated. Meanwhile, the shorter the time during which the stability continues set is, the more difficult it becomes for the state to be determined as being a "stable state," and as a result, it becomes easier for "response" of the results of measurement to be displayed to be achieved, because the stable average weight is not displayed, but it becomes difficult to display an average weight where the effects of various types of vibration noise are subdued.

In addition, at least one of the number of samples of the averaging parameters, the amount of fluctuation in weight for starting averaging and the time during which stability continues is preset in the "measurement mode," and the "standard measurement mode," where the number of samples of the averaging parameters, the amount of fluctuation in weight for starting averaging and the time during which stability continues are all set so as to be appropriate for general measurement, the "gradual measurement mode," which is set so as to be appropriate for measurement of a desired amount, which is changed little by little through sequential addition (or removal) of the object being measured, and the "disturbance resistant mode," which is set so as to be appropriate for measurement in an environment where the level of vibration from the outside, such as vibration in the floor, is high, can be cited as examples.

In the electronic balance according to the present invention, first, one measurement mode is selected from among a number of measurement modes in the input portion for the measurement mode. Furthermore, the input portion for addition and modification is used to adjust the average parameter in the selected measurement mode, and thus, the mode can be changed, so that the average weight displayed is more stable and the response of the average weight displayed can be made faster.

EFFECTS OF THE INVENTION

As described above, in the electronic balance according to the present invention, when the user of the electronic balance selects one measurement mode from among a number of measurement modes and feels that they "want to make the response a little bit faster" than in the current measurement mode, or that "desires to increase the stability a little because the environment for use is poor" during measurement in the selected measurement mode, the user can freely set the balance between the "stability of the average weight" and the "response of the average weight" on the basis of the subjective stability and response they sense while measuring at the time.

(Other Means for Solving Problem and Effects)

In addition, In the electronic balance according to the present invention, the above described averaging parameter is the number of samples, which is the number of times the weight is measured, on which an averaging process is carried out, and the above described amount of fluctuation in weight for starting averaging is changed in such a manner that the number of samples increases on the basis of the number of samples in the above described selected measurement mode, and thus, the stability of the displayed average weight improves, while the above described selected measurement mode is changed so that the number of samples is reduced on the basis of the number of samples in the measurement mode, and thus, the response of the average weight to be displayed improves.

In addition, in the electronic balance according to the present invention, the above described average weight display controlling portion calculates a first average weight, which is a moving average of the measured weight of which the number of samples is the number of measured weight on which an averaging process is carried out, in sequence when measured weight is stored in the above described measured weight storing portion in sequence, and at the same time, stores the first average weight in the average weight storing portion in sequence, furthermore, calculates a second average weight, which is a moving average of the first average weight of the above described number of samples in sequence when the first average weight is stored in the above described average weight storing portion, in sequence, and at the same time, stores the second average weight in the average weight storing portion in sequence, and thus, calculates and stores the mth average weight in sequence, the above described averaging parameter has a corresponding set number m in order to display the mth average weight, and the above described average weight display controlling portion improves the stability of the average weight to be displayed when such a modification is made that the set number m increases using the set number m in the above described selected measuring mode as a reference while improving the response of the average weight to be displayed when such a modification is made that the set number m decreases using the set number m in the above described selected measuring mode as a reference.

Here, the set number is the number that indicates m for displaying the mth average weight. Accordingly, the greater the set number is, the more the "stability of the average weight" is achieved, and the greater the set number is, the longer the time required before the average weight is displayed in the display portion is. Meanwhile, the smaller the set number is, the more the "response of the average weight" is achieved, and the smaller the set number is, the easier the average weight tends to fluctuate as a result of failure to subdue the effects of various types of vibration noise.

In addition, the electronic balance according to the present invention is further provided with a calculation portion for calculating the width of fluctuation which indicates chronographic change in the measured weight stored in the above described measured weight storing portion in sequence, the above described averaging parameter is a first threshold value of the width of fluctuation of the measured weight for determining whether or not a stable state has been gained, the above described average weight display controlling portion determines that a stable state has been gained when the above described width of fluctuation falls within the first threshold value and displays the average weight, which is the average measured weight of the number of samples, in the display portion and determines that a stable state has not been gained when the above described width of fluctuation is outside the first threshold value, and displays the average weight or the measured weight, which is the average measured weight of the number of samples that is smaller than the number of samples in the above described stable state, in the display portion, and when such a modification is made that the first threshold value increases using the first threshold value in the above described selected measured mode as a reference, it becomes easy to determine whether the state is stable, while when such a modification is made that the first threshold value decreases using the first threshold value of the above described selected measuring mode as a reference, it becomes difficult to determine whether the state is stable.

Furthermore, the electronic balance according to the present invention is further provided with a calculation portion for calculating the width of fluctuation which indicates chronographic change in the measured weight stored in the above described measured weight storing portion in sequence, the above described averaging parameters are the first threshold value of the width of fluctuation in the above described measured weight for determining whether the state is stable and a second threshold value for the continuing time of the state where the width of fluctuation in the above described measured weight is the first threshold value or less, the above described average weight display controlling portion determines that the state is stable when the continuing time after the above described width of fluctuation becomes the first threshold value or less is longer than the second threshold value and displays the average weight, which is the average measured weight of the number of samples, in a display portion and determines that the state is not stable when the continuing time after the above described width of fluctuation becomes the first threshold value or less is not longer than the second threshold value, and displays the average weight or the measured weight, which is the average measured weight of the number of samples that is smaller than the number of samples in the above described stable state, and when such a modification is made that the second threshold value becomes shorter using the second threshold value in the above described selected measured mode as a reference, it becomes easy to determine whether the state is stable, while when such a modification is made that the second threshold value becomes longer using the second threshold value of the above described selected measuring mode as a reference, it becomes difficult to determine whether the state is stable.

Moreover, the electronic balance according to the present invention is further provided with an averaging parameter display controlling portion for displaying an image indicating the averaging parameter where a modification has been made in the display portion.

In the electronic balance according to the present invention, an image indicating the averaging parameter that has been modified is shown in the display portion, and therefore, the user of the electronic balance can easily understand the balance between the "stability of the average weight" and the "response of the average weight."

Figure 1:
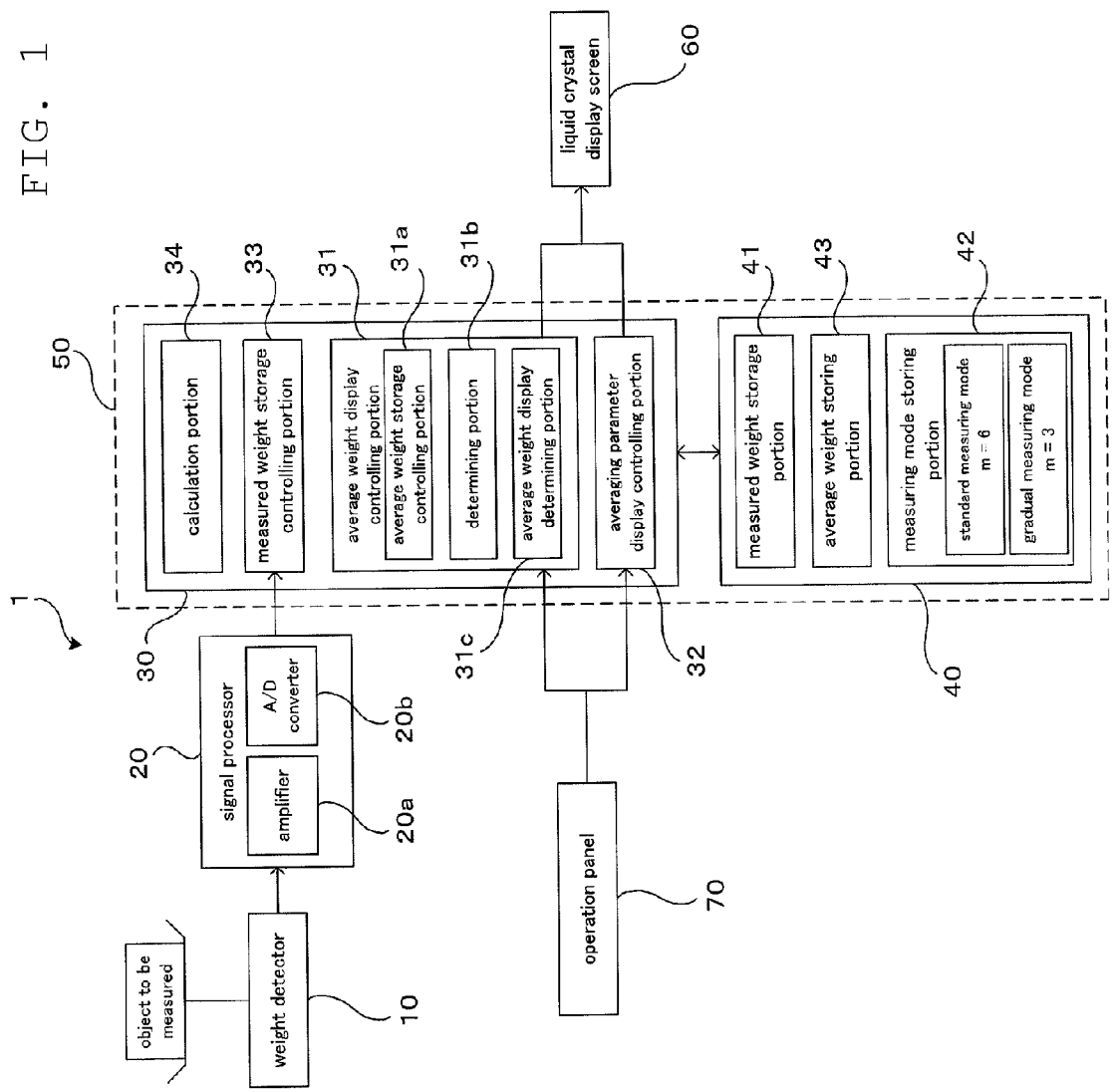
FIG. 1 is a block diagram showing the configuration of an electronic balance according to the present invention.

EXPLANATION OF SYMBOLS 1, 101 electronic balance
31, 131 average weight display controlling portion
33, 133 measured weight storage controlling portion
41, 141 measured weight storing portion
42, 142 measurement mode storing portion
43, 143 average weight storing portion
60 liquid crystal display screen (display portion)
71 switch for modification through addition (input portion for modification through addition)
72 switch for measurement mode (input portion for measurement mode)

DETAILED DESCRIPTION OF THE EXEMPLARY EMBODIMENTS

In the following, the embodiments of the present invention are described in reference to the drawings. Here, the present invention is not limited to the following embodiments and, of course, includes various embodiments within such a scope as not to deviate from the gist of the present invention.

First Embodiment

Figure 2:
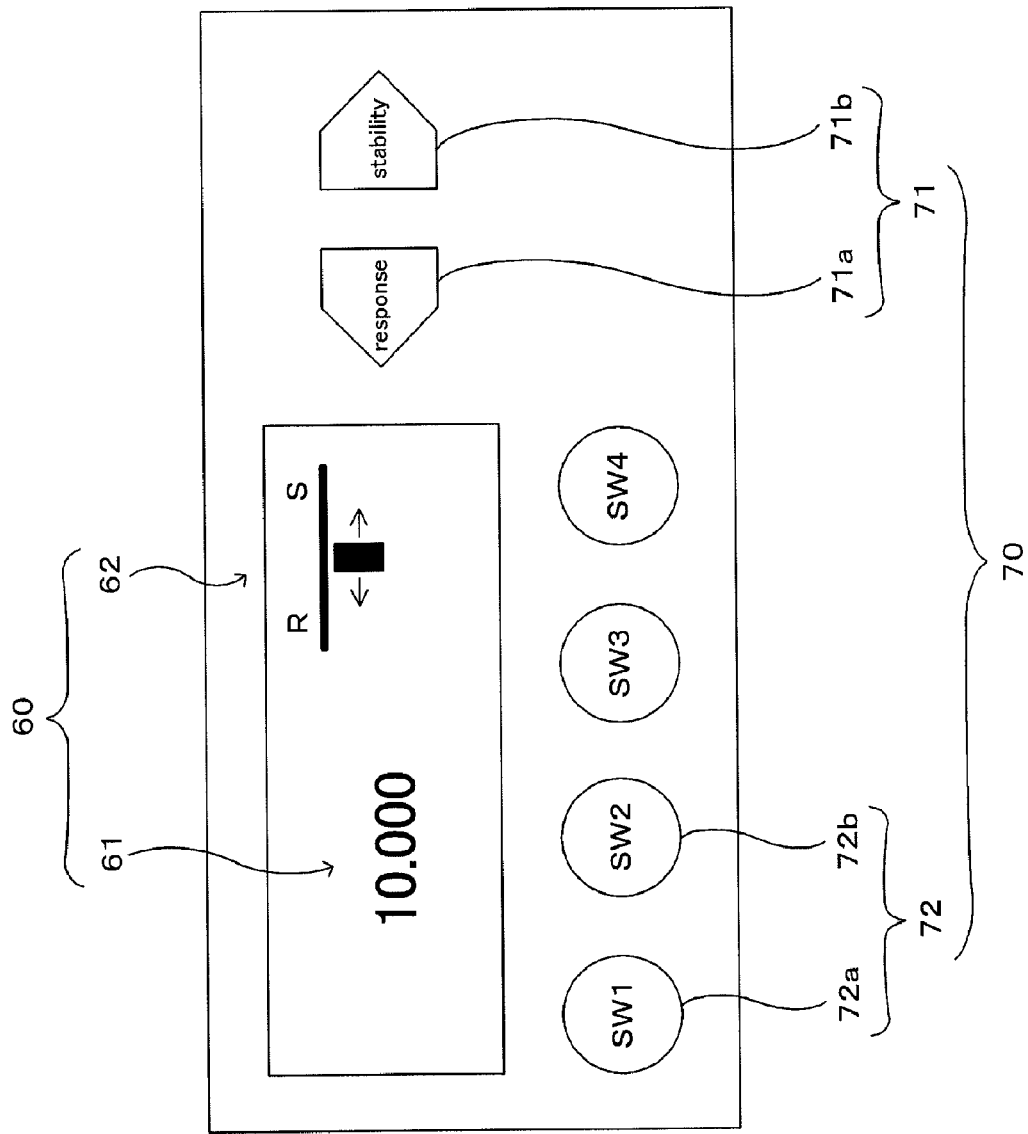
FIG. 2 is a diagram showing an example of an operation panel and a liquid crystal display screen of the electronic balance shown in FIG. 1.
Figure 3:
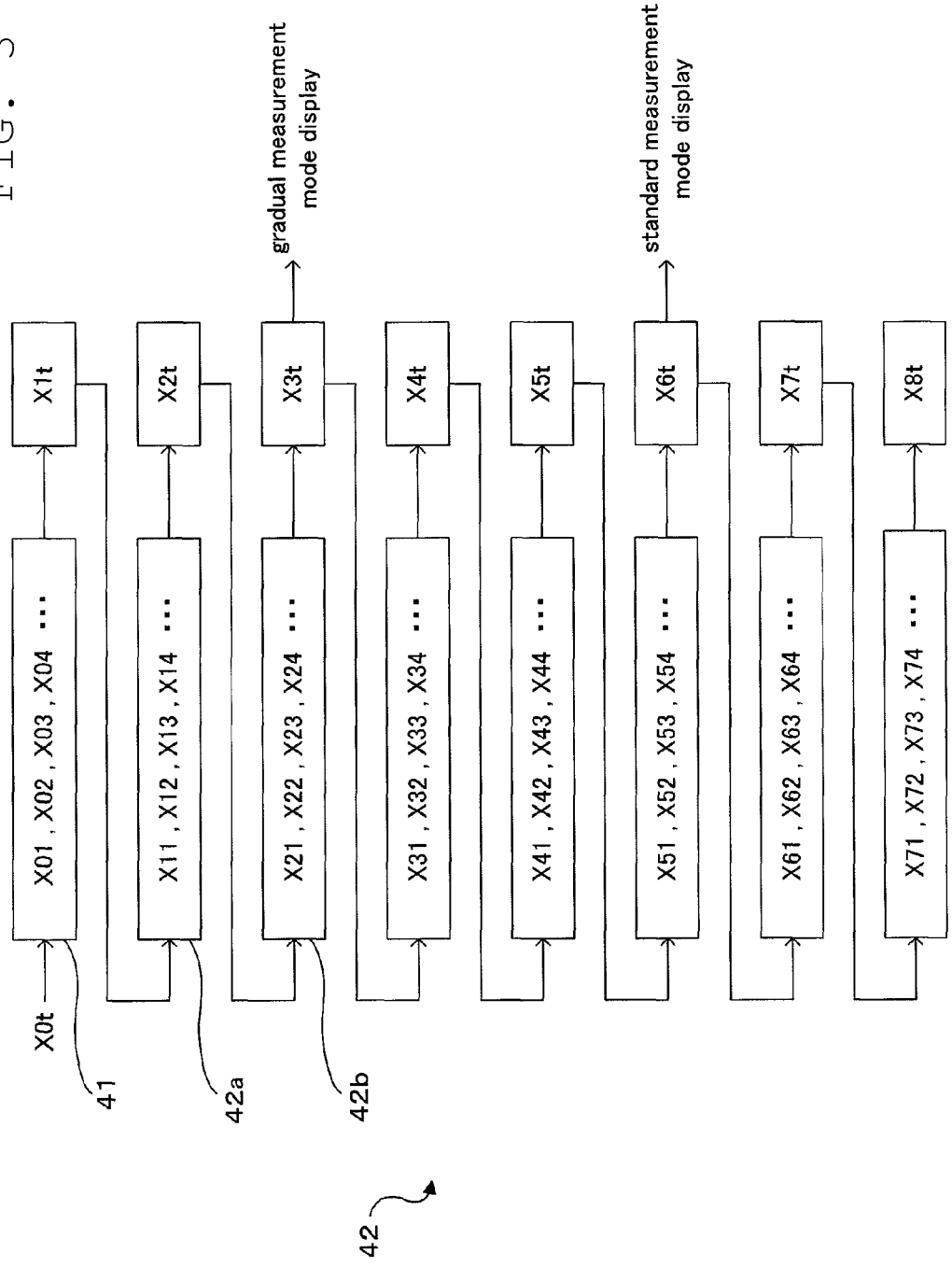
FIG. 3 is a diagram for illustrating a calculation method for calculating the average weight.
Figure 4:
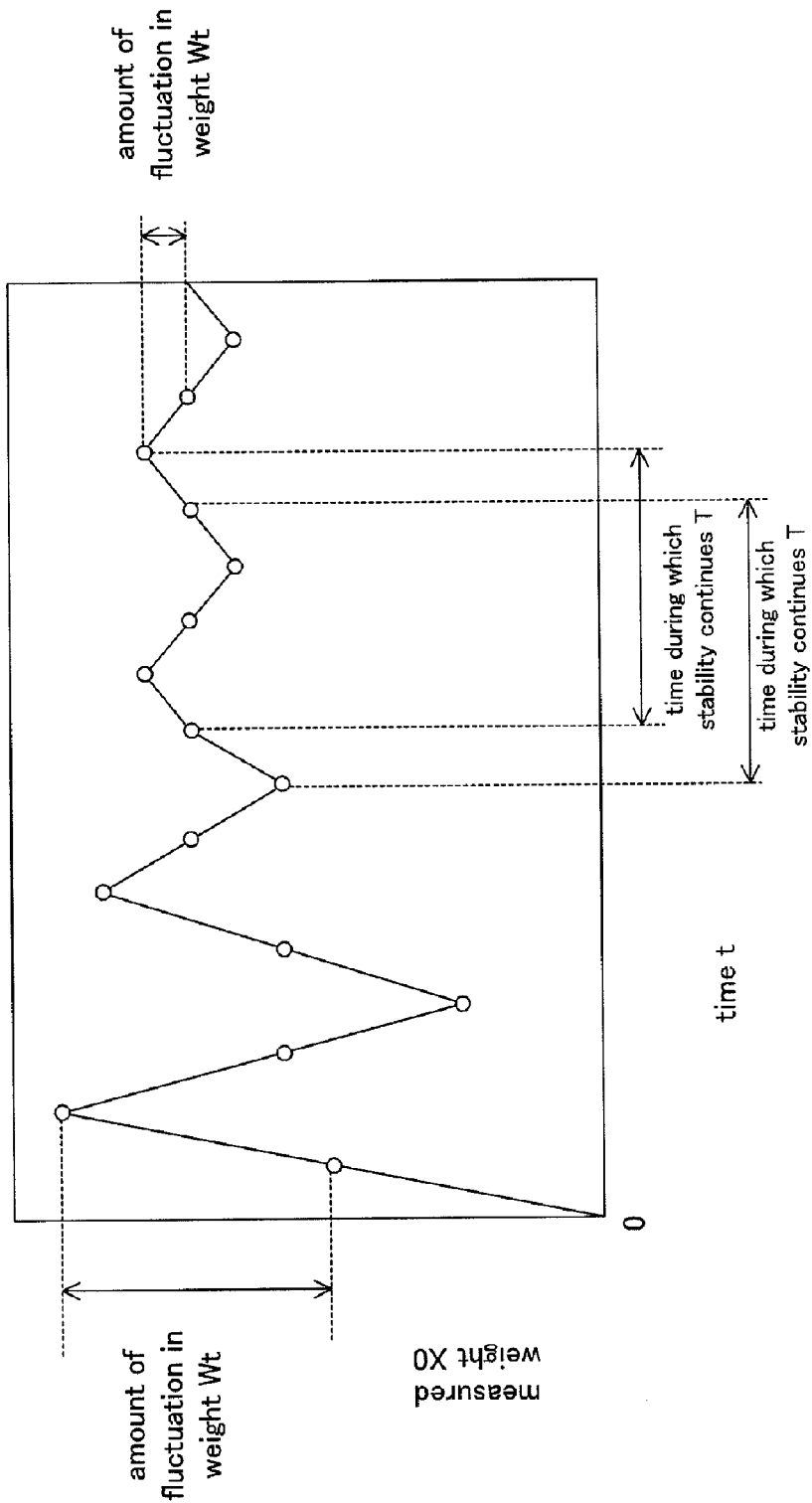
FIG. 4 is a diagram for illustrating a calculation method for calculating the amount of fluctuation in the weight.

FIG. 1 is a block diagram showing the configuration of an electronic balance according to the present invention, and FIG. 2 is a diagram showing an example of an operation panel (input portion) and a liquid crystal display screen (display portion) of the electronic balance shown in FIG. 1. In addition, FIG. 3 is a diagram for illustrating a calculation method for calculating the mth average weight Xmt (mth average weight described in detail below) and FIG. 4 is a diagram for illustrating a calculation method for calculating the amount of fluctuation in the weight Wt. Here, "t" indicates time.

In the electronic balance 1 according to the present embodiment, the balance between the "stability of the average weight" and the "response of the average weight" can be set by adjusting the set number m (averaging parameter). Concretely, the set number m=1 corresponds to display of the first average weight $X1t$, the set number m=2 corresponds to display of the second average weight $X2t$ and the set number m corresponds to display of the mth average weight Xmt. As a result, the total number of measured weights collected to calculate the average weight is $4^m$, and therefore, the greater the set number m is, the more "stability of the average weight" can be achieved, and conversely, the smaller the set number m is, the faster the "response of the average weight" can be made.

In the following, for the sake of simplifying the description, an electronic balance 1 having an averaging function for selection between two measurement modes: "standard measurement mode" and "gradual measurement mode," where the averaging parameters are preset so that only the set number m is different is described. Therefore, the number of samples is fixed to 4, the amount of fluctuation in the weight for starting averaging (first threshold value) W is fixed to W, and the time during which the stability continues (second threshold value) is fixed to T as the averaging parameters.

Here, "standard measuring mode" is set placing importance on the "stability of the average weight" and the set number (hereinafter referred to as reference set number in standard measurement mode) m=6 is preset so as that the sixth average weight X6t is displayed in the present embodiment. As a result, when the user selects the "standard measurement mode," an average weight of the object to be measured where the effects of various types of vibration noise included in the measured weight are subdued, can be gained, due to the large reference set number m=6.

In addition, "gradual measurement mode" is set placing importance on the "response of the average weight" and the set number (hereinafter referred to as reference set number in gradual measurement mode) m=3 is preset so that the third average weight X3t can be displayed in the present embodiment. As a result, when the user selects the "gradual measurement mode," the time for calculating the average weight becomes short, so that the object to be measured can be quickly placed on the balance or removed, due to the small reference set number m=3.

The electronic balance 1 is provided with a weight detector 10, a signal processor 20, a microcomputer 50, an operational panel (input portion) 70 and a liquid crystal display screen (display portion) 60.

The weight detector 10 detects the weight of the object to be measured, which is placed on the top surface of the measuring dish using a load cell (not shown) so that analog signals are outputted to the signal processor 20 in sequence at predetermined time intervals.

The signal processor 20 is provided with an amplifier 20a for amplifying analog signals detected by the weight detector 10 and an A/D converter 20b for converting the analog signal to a digital signal (measured weight) after amplification.

The microcomputer 50 is formed of a CPU (data processing apparatus) 30 and a memory 40. When the functions of the CPU 30 are compared to a block, the block has a measured weight storage controlling portion 33, an average weight display controlling portion 31, an averaging parameter display controlling portion 32 and a calculation portion 34.

In addition, the memory 40 has a measured weight storing portion 41 for storing the measured weight (digital signals) in sequence, an average weight storing portion 43 for storing the mth average weight in sequence, and a measurement mode storing portion 42 for storing two measurement modes: "standard measurement mode," where the reference set number m=6 (averaging parameter) is preset in order to display the sixth average weight, and "gradual measurement mode," where the reference set number m=3 (averaging parameter) is preset in order to display the third average weight.

The operation panel (input portion) 50 has a switch for the measurement mode (input portion for measurement mode) 72 with which the user carries out an input operation in order to select one measurement mode from among "standard measurement mode" and "gradual measurement mode," and a switch for modification through addition (input portion for modification through addition) 71 with which the user carries out an input operation in order to adjust either the reference set number m in "standard measurement mode" selected by the switch for the measurement mode 72 or "gradual measurement mode."

The switch for the measurement mode 72 is made up of a standard measurement mode switch (SW1) 72a and a gradual measurement mode switch (SW2) 72b.

Concretely, the user presses the standard measurement mode switch 72a so that the mode becomes "standard measurement mode," and as a result, the averaging parameter becomes the reference set number m=6 in the standard measurement mode, and when the user presses the gradual measurement mode switch 72b, the mode becomes "gradual measurement mode," and as a result, the averaging parameter becomes the reference set number m=3 in gradual measurement mode. As described above, the user selects one of the reference set numbers m in either "standard measurement mode" or "gradual measurement mode" corresponding to the respective applications and environment for use. Here, according to the present invention, the reference set number m in "standard measurement mode" or "gradual measurement mode" is further adjusted as described below, so that the object to be measured can be measured.

The switch for modification through addition 71 is made up of a response switch 71a and a stable switch 71b. In the present embodiment, adjustment is possible in five stages in total (m−2, m−1, m, m+1, m+2), so that the set number m can be adjusted in two stages, large and small, with the reference set number m, which is determined in the selected "standard measurement mode" or "gradual measurement mode" as a reference.

Concretely, the set number is adjusted to be smaller (m−1) than the set number m at the time when the user presses the response switch 71a once, and as a result, the response of the average weight displayed in the measurement result weight displaying region 61 on the liquid crystal display screen 60 becomes faster, and furthermore, the set number is adjusted to be still smaller by 1 when the user presses the response switch 71 once more, and as a result, the response of the average weight displayed in the measurement result weight displaying region 61 becomes faster.

In addition, the set number is adjusted to be greater (m+1) than the set number m at the time when the user presses the stability switch 71b once, and as a result, the average weight displayed in the measurement result weight displaying region 61 becomes more stable, and furthermore, the set number is adjusted to further increase by 1 when the user presses the stability switch 71b once more, and as a result, the average weight displayed in the measurement result weight displaying region 61 becomes more stable.

The averaging parameter display controlling portion 32 carries out such control that an image showing the set number m that has been modified through addition is displayed in the averaging parameter displaying region 62 on the liquid crystal display screen 60. Concretely, according to the present embodiment, the set number m can be adjusted in five stages in total, so that the set number m can be set in two stages: large and small, with the reference set number m that is determined in the selected "standard measurement mode" or "gradual measurement mode" as a reference, and therefore, a mark which can move in five stages in the left-right direction along the bar in the horizontal direction is provided. Here, the left direction R of the bar corresponds to pressing of the response switch 71a, and the right direction S of the bar corresponds to pressing of the stable switch 71b.

As a result, the user can see that the set number is the reference set number m when the mark is at the center of the bar, that the set number is smaller than the reference set number m by one step when the mark moves one step in the left direction from the center of the bar, and that the set number is greater than the reference set number m by two steps when the mark moves two steps in the right direction from the center of the bar.

The measured weight storage controlling portion 33 carries out such control that the weight of the object to be measured is detected by the weight detector 10 and the measured weight X0t that has been converted to a digital signal by the signal processor 20 is stored in the measured weight storing portion 41 in sequence at predetermined time intervals (see FIG. 3).

Concretely, when the user puts the object to be measured on the top surface of the measuring dish of the weight detector 10, the weight of the object to be measured is detected by the weight detector 10, and the signal processor 20 allows the measured weight X0t to be stored in the measured weight storing portion (first buffer) 41 in sequence at predetermined time intervals.

The calculation portion 34 carries out such control the amount of fluctuation in the weight Wt, which indicates chronographic change between the measured weight X0t stored in the first buffer 41 at time t and the measured weight X0(t+1) stored in the first buffer 41 at time (t+1), is calculated in sequence (see FIG. 4).

Concretely, when the measured weight X0t is stored at time t and the measured weight X0(t+1) is stored at time (t+1), the amount of fluctuation in the weight Wt=X0t−(X0 (t+1)) is calculated. In addition, when the measured weight X0(t+2) is stored at time (t+2), the amount of fluctuation in the weight W (t+1)=(X0(t+1))−(X0(t+2)) is calculated. In this manner, the amount of fluctuation in the weight Wt is calculated in sequence.

The average weight display controlling portion 31 has an average weight storage controlling portion 31a, a determining portion 31b and an average weight display determining portion 31c.

When the measured weight X0t is stored in sequence in the first buffer 41, the average weight storage controlling portion 31a calculates the first average weight X1t, which is the moving average of the measured weight X0t for the number of samples 4, in sequence, and at the same time, stores the first average weight X1t in the average weight storing portion 43 in sequence, and furthermore, when the first average weight X1t is stored in the average weight storing portion 43 in sequence, the average weight storage controlling portion 31a calculates the second average weight X2t, which is the moving average of the first average weight X1t for the number of samples 4, in sequence, and at the same time, stores the second average weight X2t in the average weight storing portion 43 in sequence, so that such control is carried out that the mth average weight Xmt is calculated in sequence and stored (see FIG. 3).

Concretely, when the measured weight X0t is stored in the first buffer 41 in sequence, the average weight storage controlling portion 31a calculates the first average weight X1t, which is the moving average of the measured weight X0t for the number of samples 4, in sequence, and at the same time, stores the first average weight X1t in the second buffer 43a of the average weight storing portion 43 in sequence.

Furthermore, when the first average weight X1t is stored in the second buffer 43a in sequence, the average weight storage controlling portion 31a calculates the second average weight X2t, which is the moving average of the first average weight X1t for the number of samples 4, in sequence, and at the same time, stores the second average weight X2t in the third buffer 43b of the average weight storing portion 43 in sequence. In the same manner, the average weight storage controlling portion 31a calculates the third average weight X3t, the fourth average weight X4t, the fifth average weight X5t, the sixth average weight X6t and the seventh average weight X7t in sequence, and finally, calculates the eighth average weight X8t, which is the moving average of the seventh average weight X7t for the number of samples 4.

The determining portion 31b carries out such control that whether or not the time during which stability continues after the amount of fluctuation in the weight Wt becomes within the amount of fluctuation in the weight for starting averaging (first threshold value) W is longer than the time during which the stability continues (second threshold value) t is determined in sequence (see FIG. 4).

Concretely, whether or not the amount of fluctuation in the weight Wt that is calculated in the calculation portion 34 exists for the time during which the stability continues T (for example the period from t to t+4) within the amount of fluctuation in the weight for starting averaging W is determined. In addition, when the next amount of fluctuation in the weight Wt is calculated in the calculation portion 34, whether or not the amount of fluctuation in the weight Wt exists for the time during which stability continues T (for example the period from t+1 to t+5) within the amount of fluctuation in the weight for starting averaging W is determined. In this manner, whether or not the amount of fluctuation in the weight Wt exists for the time during which stability continues T within the amount of fluctuation in the weight for starting averaging W is determined in sequence.

Here, in the case where the fluctuation in the amount of fluctuation in the weight is large, the mark in the above described average parameter display region 62 may blink, in order to alert the user of this.

The average weight display determining portion 31c carries out such control that the average weight is displayed in the measurement result weight displaying region 61 on the liquid crystal display screen 60 on the basis of the set number m adjusted by the operation panel 70.

First, a display method for displaying the average weight in the measurement result weight displaying region 61 in the case where the user selects "standard measurement mode" (reference set number m=6) is described (see FIG. 3). Here, in this case, the reference set number m that is determined in "standard measurement mode" is not adjusted at all.

When the user places the object to be measured on the upper surface of the measuring dish of the weight detector 10, the weight detector 10 detects the weight of the object to be measured and the signal processor 20 allows the measured weight X0t to be stored in the first buffer 41 in sequence. After that, when it is determined that the time during which stability continues is longer than the time during which stability continues t after the amount of fluctuation in the weight Wt as calculated by the calculation portion 34 becomes within the amount of fluctuation in the weight for starting averaging W, the eighth average weight X8t, which is the moving average of the seventh average weight X7t for the number of samples 4, is calculated in sequence by the average weight storage controlling portion 31a, and in the case where the "standard measurement mode" is selected, the average weight display determining portion 31c displays the sixth average weight X6t in the measurement result weight displaying region 61 when the sixth average weight X6t, which corresponds to the reference set number m=6 in the standard measurement mode, is calculated. That is to say, the measured weight, of which the number is $4^6$ in total, is collected, and the measured weight, of which the number is $4^6$ in total, is averaged, and thus, the average weight is displayed. Therefore, the user can acquire an average weight where the effects of various types of vibration noise have been subdued due to the number of collected measured weight as great as $4^6$ in total. However, it takes time for the average weight storage controlling portion 31a to calculate the sixth average weight X6t and the average weight to be displayed in the measurement result weight displaying region 61.

Next, a display method for displaying the average weight in the measurement result weight displaying region 61 in the case where the user selects "gradual measurement mode" (reference set number m=3) is described in reference to FIG. 3. Here, in this case, the reference set number m determined in "gradual measurement mode" is not adjusted at all.

In the same manner as in the case where the above described "standard measurement mode" is selected, when the user places the object to be measured on the upper surface of the measuring dish of the weight detector 10, the average weight storage controlling portion 31a calculates the eighth average weight X8t, which is the moving average of the seventh average weight X7t for the number of samples 4, when it is determined that the time during which the stability continues is longer than the time during which stability continues t after the amount of fluctuation in the weight Wt becomes within the amount of fluctuation in the weight for starting averaging W, while in the case where "gradual measurement mode" is selected, when the third average weight X3t, which corresponds to the reference set number m=3 in gradual measurement mode, is calculated, the average weight displaying determining portion 31c displays the third average weight X3t in the measurement result weight displaying region 61 in sequence. That is to say, the measured weight, of which the number is $4^3$ in total, is collected, and the measured weight, of which the number is $4^3$ in total, is averaged, and thus, the third average weight X3t is displayed. Accordingly, the user can gain the average weight only by spending time for the average weight storage controlling portion 31a to calculate the third average weight X3t. However, the number of collected measured weight is as small as $4^3$ in total, and therefore, the average weight is gained without the effects various types of vibration noise being subdued.

Next, a display method for displaying the average weight in the measurement result weight displaying region 61 by pressing the stability switch 71b n times and adjusting the set number m in order to further stabilize the average weight displayed in the measurement result weight displaying region 61 in the case where the user selects "standard measurement mode" is described in reference to FIG. 3.

In the same manner as in the case where the above describe "standard measurement mode" is selected, when the user places an object to be measured on the upper surface of the measuring dish of the weight detector 10, the eighth average weight X8t, which is the moving average of the seventh average weight X7t for the number of samples 4, is calculated by the average weight storage controlling portion 31a when it is determined that the time during which stability continues is longer than the time during which stability continues t after the amount of fluctuation in the weight Wt becomes within the amount of fluctuation in the weight for starting averaging W, while in the case where the "standard measurement mode" is selected and the stability switch 71b is pressed n times, the average weight display determining portion 31c displays the (6+n)th average weight X(6+n)t in the measurement result weight displaying region 61 in sequence when the (6+n)th average weight X(6+n)t is calculated. That is to say, a measured weight of which the number is $4^{(6+n)}$ in total is collected, and the measured weight, of which the number is $4^{(6+n)}$, is averaged, and thus, the average weight is displayed. That is to say, the user can gain an average weight where the effects of various types of vibration noise are more subdued than in the case where "standard measurement mode" is selected.

Next, a display method for displaying the average weight in the measurement result weight displaying region 61 by pressing the response switch 71a n times and adjusting the set number m in order to further increase the response of the average weight displayed in the measurement result weight displaying region 61 in the case where the user selects "standard measurement mode" is described in reference to FIG. 3. In the same manner as in the case where the above describe "standard measurement mode" is selected, when the user places an object to be measured on the upper surface of the measuring dish of the weight detector 10, the eighth average weight X8t, which is the moving average of the seventh average weight X7t for the number of samples 4, is calculated by the average weight storage controlling portion 31a when it is determined that the time during which stability continues is longer than the time during which stability continues t after the amount of fluctuation in the weight Wt becomes within the amount of fluctuation in the weight for starting averaging W, while in the case where the "standard measurement mode" is selected and the response switch 71a is pressed n times, the average weight display determining portion 31c displays the (6-n)th average weight X(6-n)t in the measurement result weight displaying region 61 in sequence when the (6-n)th average weight X(6-n)t is calculated. That is to say, a measured weight of which the number is $4^{(6-n)}$ in total is collected, and the measured weight, of which the number is $4^{(6-n)}$, is averaged, and thus, the average weight is displayed. That is to say, the user can gain an average weight where less time is spent than in the case where "standard measurement mode" is selected.

Here, in the case where the user selects "gradual measurement mode," the balance between the "stability of the average weight" and the "response of the average weight" can be freely set in the same manner when "it is desired to increase the response of the average weight slightly" or "it is desired to increase the stability of the average weight slightly because the environment for use is poor," and therefore, the description thereof is omitted.

As described above, in the electronic balance 1 according to the present invention, when the user selects one measurement mode from among "standard measurement mode" and "gradual measurement mode" and "wants to increase the response slightly" from in the measurement mode at the time, or feels "the stability should be increased slightly because the environment for use is poor" during measurement in the selected measurement mode, they can freely set the balance between the "stability of the average weight" and the "response of the average weight" with the subjective stability and response measured at the time as the reference according to their sense.

Figure 5:
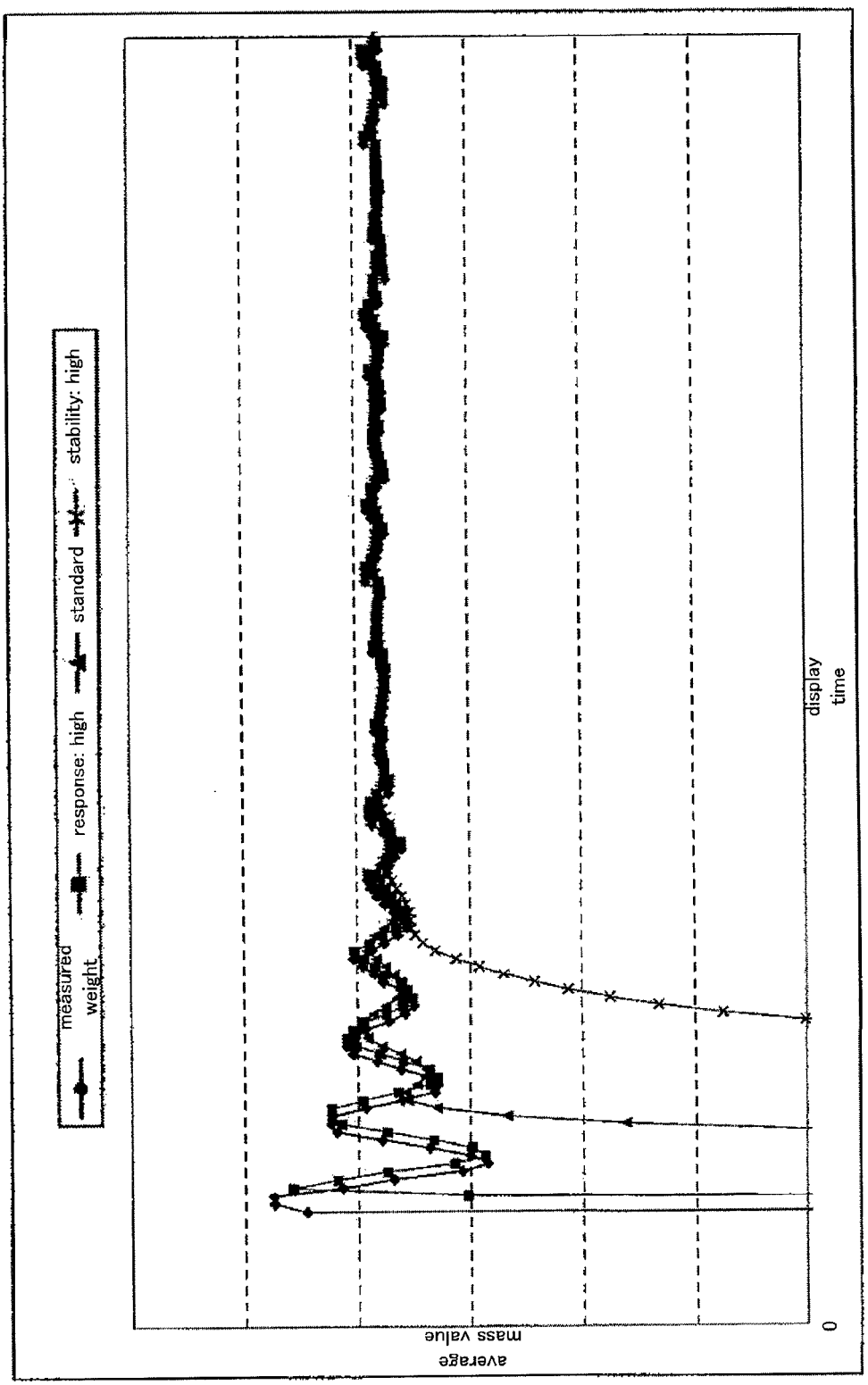
FIG. 5 is a graph showing the relationship between the value of the average weight and the displayed time.

Here, FIG. 5 is a graph showing the relationship between the value of the average weight and the display time in the case where "standard measurement mode" is selected, in the case where "standard measurement mode" is selected and the response switch 71a is pressed two times, and in the case where "standard measurement mode" is selected and the stability switch 71b pressed two times.

Second Embodiment

Figure 6:
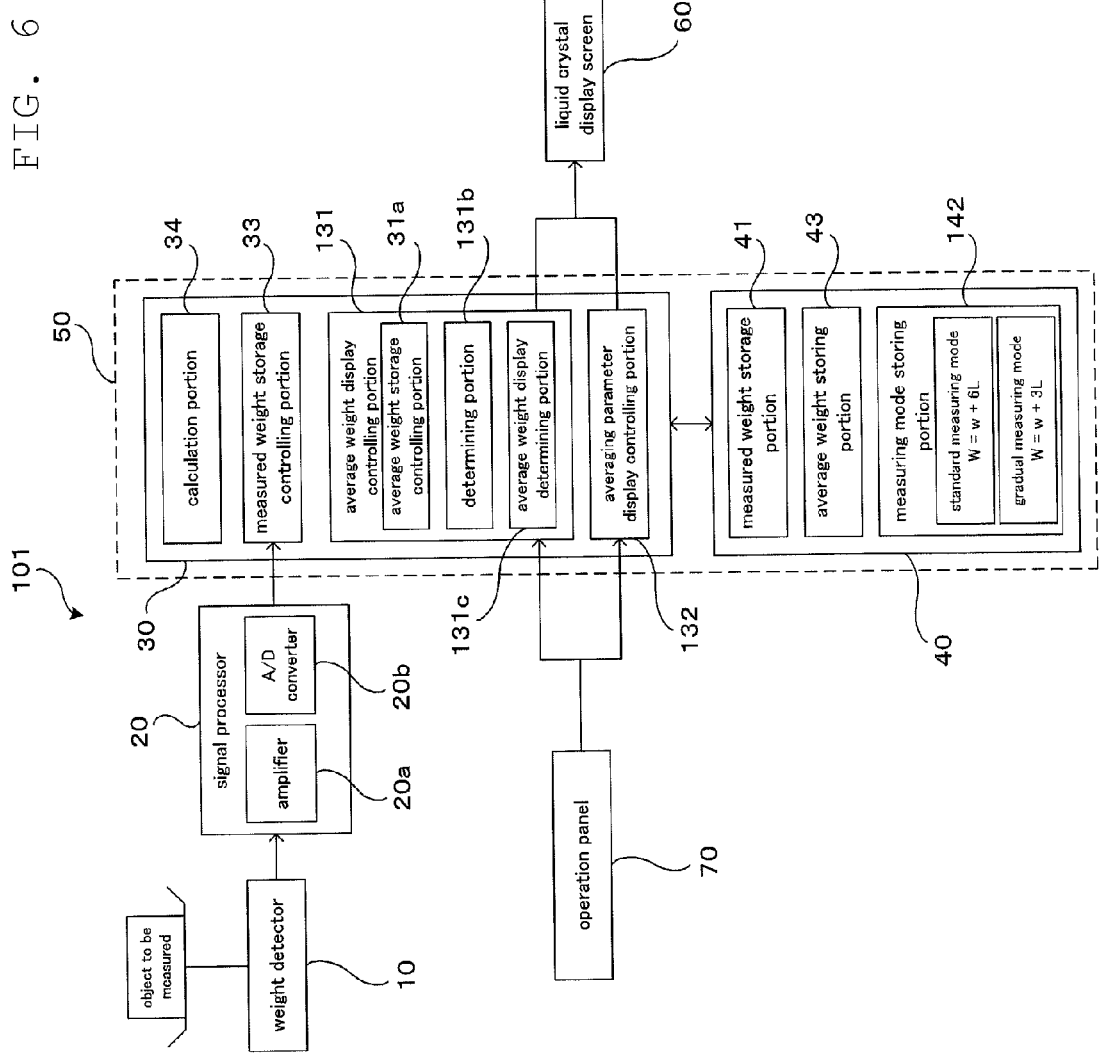
FIG. 6 is a block diagram showing the configuration of another electronic balance according to the present invention.

FIG. 6 is a block diagram showing the configuration of another electronic balance 101 according to the present invention. In the electronic balance 101, instead of adjusting the set number m as the averaging parameter, as in the above described electronic balance 1, the size of the amount of fluctuation in the weight for starting averaging (first threshold value) W for determining whether or not a stable state has been achieved is adjusted, and thus, the balance between the "stability" and the "response" is set. Concretely, when there is an amount of fluctuation in weight Wt within the amount of fluctuation in the weight for starting averaging W, the eighth average weight X8t is displayed in the measurement result weight displaying region 61, while when there is no amount of fluctuation in weight Wt in the amount of fluctuation in weight for starting averaging W, the measured weight X0t is displayed in the measurement result weight displaying region 61. That is to say, when there is an amount of fluctuation in weight Wt within the amount of fluctuation weight for starting averaging W, the weight, which is collected in order to calculate the average weight, is measured $4^8$ times in total, and therefore, the "stability" of the displayed measurement results can be achieved, and conversely, when there is no amount of fluctuation in weight Wt in the amount of fluctuation in weight for starting averaging W, the measured weight X0t is displayed as it is, and therefore, the "response" of the displayed measurement result can be achieved. As a result, the greater the amount of fluctuation in weight for starting averaging W set is, the easier it tends to be whether the state is a "stable state," and as a result, the average weight is displayed, and thus, it becomes easy to gain results of measurement having high "stability," but the time required for displaying the average weight tends to be long, because the average weight is calculated. Meanwhile, the smaller the amount of fluctuation in the weight for starting averaging W set is, the more difficult it becomes to determine whether the state is a "stable state," and as a result, the time for calculating the average weight is not necessary, and therefore, it becomes easy to gain results of measurement having good "response," but it becomes difficult to gain an average weight where the effects of various types of vibration noise are subdued.

In the following, for the sake of simplicity in the description, the electronic balance 101 is assumed to be provided with an averaging function for selecting between two preset measurement modes: "standard measurement mode" and "gradual measurement mode," having different sizes of the amount of fluctuation in the weight for starting averaging W as the averaging parameter. Thus, the number of samples 4 and the number of settings 8 are fixed as the averaging parameters. Here, the same symbols are used in configurations which are the same as that in the electronic balance 1 in the first embodiment, and description thereof is omitted.

Here, "standard measurement mode" is set placing importance on the "stability," and in the present embodiment, the amount of fluctuation in the weight for starting averaging (hereinafter referred to as reference amount of fluctuation in weight for starting averaging in standard measurement mode) W is set to (w+6L) so that the average weight is displayed when the amount of fluctuation becomes within the amount of fluctuation in weight for starting averaging W=(w+6L). Here, "w" and "L" are preset constants. As a result, the reference amount of fluctuation in weight for starting averaging is as large as W=(w+6L), and therefore, it becomes easy for there to be an amount of fluctuation in weight Wt within the amount of fluctuation in weight for starting averaging W=(w+6L). That is to say, it is easy to determine whether a "stable state" has been achieved. Accordingly, it becomes easy to gain results of measurement having high "stability."

In addition, "gradual measurement mode" is set placing importance on the "response," and in the present embodiment, the amount of fluctuation in the weight for starting averaging (hereinafter also referred to as reference amount of fluctuation in weight for averaging in gradual measurement mode) W is set to be (w+3L), so that the average weight can be calculated when the amount of fluctuation in weight becomes within the amount of fluctuation in weight for starting averaging W=(w+3L). As a result, when the user selects "gradual measurement mode," it becomes difficult for there to be an amount of fluctuation in weight Wt within the amount of fluctuation in weight for starting averaging (w+3L), due to the reference amount of fluctuation in weight for starting averaging being as small as W=(w+3L). That is to say, it is difficult to determine whether the state is a "stable state." Accordingly, it tends to be easy to gain measurement results having good "response."

The electronic balance 101 is provided with a weight detector 10, a signal processor 20, a microcomputer 50, an operation panel (input portion) 70 and a liquid crystal display screen (display portion) 60.

The microcomputer 50 is formed of a CPU (data processing unit) 30 and a memory 40. When the functions of the CPU are illustrated as a block, the CPU has a measured weight storage controlling portion 33, an average weight display controlling portion 131, an averaging parameter display controlling portion 132 and a calculation portion 34.

In addition, the memory 40 has a measured weight storing portion 41 for storing measured weight (digital signals) in sequence, an average weight storing portion 43 for storing the mth average weight in sequence, and a measurement mode storing portion 142 for storing two measurement modes: a "standard measurement mode," where the reference amount of fluctuation in weight for starting averaging W=(w+6L) is preset, and a "gradual measurement mode," where the reference amount of fluctuation in weight for starting averaging W=(w+3L) is preset.

The switch for modification through addition 71 is made up of a response switch 71a and a stability switch 71b. In the present embodiment, the amount of fluctuation in weight for starting averaging W can be adjusted in five stages in total (W−2L, W−L, W, W+L, W+2L), so that the amount of fluctuation in weight for starting averaging W can be set in two stages: large and small, on the basis of the reference amount of fluctuation in weight for starting averaging W, which is determined in the selected "standard measurement mode" or "gradual measurement mode."

Concretely, the amount of fluctuation in weight for starting averaging is adjusted to be (W−L), which is smaller than the amount of fluctuation in the weight for starting averaging W at the time when the user presses the response switch 71a once, and as a result, there are more chances for results of measurement having good "response" to be displayed in the measurement result weight displaying region 61, and furthermore, the amount of fluctuation in weight for starting averaging is adjusted to be smaller by 1 when the user presses the response switch 71 once more, and as a result, there are more chances for results of measurement having good "response" to be displayed in the measurement result weight displaying region 61.

In addition, when the user presses the stability switch 71b once, the amount of fluctuation in weight for starting averaging is adjusted to be (W+L), which is greater than the amount of fluctuation in weight for starting averaging W at the time, and as a result, there are more chances for results of measurement having good "stability" to be displayed in the measurement result weight displaying region 61, and furthermore, the amount of fluctuation in the weight is adjusted so as to increase by 1 when the user presses the stability switch 71b once more, and as a result, there are more chances for results of measurement having good "stability" to be displayed in the measurement result weight displaying region 61.

The averaging parameter display controlling portion 132 carries out such control that an image showing the averaging parameter where the amount of fluctuation in weight for starting averaging W is adjusted is displayed in the averaging parameter displaying region 62 on the liquid crystal displaying screen 60.

Concretely, in the present mode, the amount of fluctuation in the weight for starting averaging W can be adjusted in five stages in total, so that the amount of fluctuation in weight for starting averaging W can be set in two stages: large and small, on the basis of the reference amount of fluctuation in weight for starting averaging W that is determined in the selected "standard measurement mode" or "gradual measurement mode," and therefore, a mark which can move in five stages in the left-right direction along the bar placed in the horizontal direction is provided. Here, the left direction R along the bar corresponds to pressing of the response switch 71a, and the right direction S along the bar corresponds to pressing of the stability switch 71b.

As a result, when the mark is at the center of the bar, for example, the user can see that the amount of fluctuation in the weight is the reference amount of fluctuation in weight for starting averaging, when the mark moves one stage in the left direction from the center of the bar, the user can see that the amount of fluctuation in the weight has been reduced one stage from the reference amount of fluctuation in weight for starting averaging, and when the mark moves two stages in the right direction from the center of the bar, the user can see that the amount of fluctuation in the weight has increased two stages from the reference amount of fluctuation in weight for starting averaging W.

The average weight display controlling portion 131 has an average weight storage controlling portion 31a, a determining portion 131b and an average weight display determining portion 131c.

The determining portion 131b determines whether or not the amount of fluctuation in weight Wt has become within the amount of fluctuation in weight for starting averaging (first threshold value) W in sequence on the basis of the amount of fluctuation in weight for starting averaging W that has been adjusted using the operation panel 70, and when the amount of fluctuation in weight Wt becomes within the amount of fluctuation in weight for starting averaging (first threshold value) W, such control is carried out that it is determined whether a stable state has been achieved (see FIG. 4).

Concretely, it is determined whether or not the amount in fluctuation in weight Wt that has been calculated in the calculation portion 34 has become within the amount of fluctuation in weight for starting averaging W. In addition, when the next amount of fluctuation in weight Wt is calculated in the calculation portion 34, it is determined whether or not the amount of fluctuation in weight Wt has become within the amount of fluctuation in weight for starting averaging W. In this manner, whether or not the amount of fluctuation in weight Wt has become within the amount of fluctuation in weight for starting averaging W is determined in sequence, and whether or not a stable state has been achieved is determined.

At this time, the greater the amount of fluctuation in weight for starting averaging W set is, the easier it becomes to determine whether a "stable state" has been achieved, and as a result, it becomes easy to gain results of measurement having good "stability," and the smaller the amount of fluctuation in weight for starting averaging W set is, the more difficult it becomes to determine whether a "stable state" has been achieved, and as a result, it becomes easy to gain results of measurement having good "response."

The average weight display determining portion 131c carries out such control that the average weight is displayed in the measurement result weight displaying region 61 on the liquid crystal display screen 60 on the basis of the results of determination by the determining portion 131b.

First, a display method for displaying the average weight in the measurement result weight displaying region 61 in the case where the user selects "standard measurement mode" is described. Here, in this case, the amount of fluctuation in weight for starting averaging W, which is determined in "standard measurement mode," is not adjusted at all.

When the user places the object to be measured on the upper surface of the measuring dish of the weight detector 10, the weight of the object to be measured is detected by the weight detector 10, and the measured weight $X0t$ is stored in the measured weight storing portion 41 in sequence by the signal processor 20.

Then, the amount of fluctuation in weight Wt is calculated by the calculation portion 34, and in the case where "standard measurement mode" is selected, the average weight display determining portion 131c displays the measured weight $X0t$ in the measurement result weight displaying region 61 in sequence until it is determined that the amount of fluctuation in weight Wt has become within the reference amount of fluctuation in weight for starting averaging W=(w+6L) in the standard measurement mode.

After that, the average weight display determining portion 131c displays the eighth average weight $X8t$ that is calculated in the average weight storage controlling portion 31a in the measurement result weight displaying region 61 in sequence when it is determined that the amount of fluctuation in weight Wt has become within the reference amount of fluctuation in weight for starting averaging W=(w+6L). That is to say, the weight, which has been measured $4^8$ times in total, is collected and the weight, which has been measured $4^8$ in total, is averaged, and thus, the average weight is displayed. Accordingly, the user can gain an average weight where the effects of various types of vibration noise have been subdued. However, it takes time for the average weight storage controlling portion 31a to calculate the eighth average weight $X8t$ and for the average weight to be displayed in the measurement result weight displaying region 61. At this time, the amount of fluctuation in weight for starting averaging W is as large as (w+6L), and therefore, it becomes easy for there to be an amount of fluctuation in weight Wt within the amount of fluctuation in weight for starting averaging W=(w+6L), and as a result, there are many chances for the eighth average weight $X8t$ to be calculated by averaging the weight $X0t$ measured $4^8$ times, so that the calculated eighth average weight $X8t$ can be displayed in the measurement result weight displaying region 61.

Next, a display method for displaying the average weight in the measurement result weight displaying region 61 in the case where the user selects "gradual measurement mode" is described. Here, in this case, the amount of fluctuation in weight for starting averaging W, which is determined in "gradual measurement mode," is not adjusted at all.

In the same manner as in the case where the above described "standard measurement mode" is selected, the weight of the object to be measured is detected by the weight detector 10 when the user places the object to be measured on the upper surface of the measuring dish of the weight detector 10, and the measured weight $X0t$ is stored in the measurement weight storing portion 41 in sequence by the signal processor 20.

Then, the amount of fluctuation in weight Wt is calculated by the calculation portion 34, and in the case where the "standard measurement mode" is simply selected, the average weight display determining portion 131c displays the measured weight X0t in the measurement result weight displaying region 61 in sequence until it is determined that the amount of fluctuation in weight Wt has become within the reference amount of fluctuation in weight for starting averaging W=(w+3L) in gradual measurement mode.

After that, the average weight display determining portion 131c displays the eighth average weight X8t, which is calculated in the average weight storage controlling portion 31a, in the measurement result weight displaying region 61 in sequence when it is determined that the amount of fluctuation in weight Wt has become within the reference amount of fluctuation in weight for starting averaging W=(w+3L).

At this time, the amount of fluctuation in weight for starting averaging W is as small as (w+3L), and therefore, it is difficult for there to be an amount of fluctuation in weight Wt within the amount of fluctuation in weight for starting averaging W=(w+3L), and as a result, there are more chances for the detected measured weight X0t to be displayed in the measurement result weight displaying region 61 as it is instead of the average weight.

Next, a display method for displaying the average weight in the measurement result weight displaying region 61 by pressing the stability switch 71b n times in order to increase the chances for results of measurement having good "stability" to be displayed in the measurement result weight displaying region 61 so that the amount of fluctuation in weight for starting averaging W is adjusted in the case where the user selects "standard measurement mode" is described.

In the same manner as in the case where the above described "standard measurement mode" is selected, the weight of the object to be measured is detected by the weight detector 10 when the user places the object to be measured on the upper surface of the measuring dish of the weight detector 10, so that the measured weight X0t is stored in the measured weight storing portion 41 in sequence by means of the signal processor 20. Thus, the calculation portion 34 calculates the amount of fluctuation in weight Wt, and in the case where "standard measurement mode" is selected and the stability switch 71b is pressed n times, the average weight display determining portion 131c displays the measured weight X0t in the measured result weight displaying region 61 in sequence until the amount of fluctuation in weight Wt is determined to have become within the amount of fluctuation in weight for starting averaging (w+(6+n)L).

After that, the average weight display determining portion 131c displays the eighth average weight X8t, which is calculated in the average weight storage controlling portion 31a, in the measurement result weight displaying region 61 in sequence when the amount of fluctuation in weight Wt is determined to be within the amount of fluctuation in weight for starting averaging W=(w+(6+n)L).

That is to say, the user has more chances to get measurement results having good "stability," because the amount of fluctuation in weight for starting averaging W is higher than in the case where "standard measurement mode" is selected.

Next, a display method for displaying the average weight in the measurement result weight displaying region 61 by pressing the response switch 71a n times so that the amount of fluctuation in weight for starting averaging W can be adjusted in order to increase chances for displaying measurement results having good "response" in the measurement result weight displaying region 61 in the case where the user selects "standard measurement mode" is described.

In the same manner as in the case where the above described "standard measurement mode" is selected, the weight of the object to be measured is detected by the weight detector 10 when the user places the object to be measured on the upper surface of the measuring dish of the weight detector 10, and the measured weight X0t is stored in the measurement weight storing portion 41 in sequence by means of the signal processor 20. Thus, the calculation portion 34 calculates the amount of fluctuation in weight Wt, and in the case where "standard measurement mode" is selected and the response switch 71 is pressed n times, the average weight display determining portion 131c displays the measured weight X0t in the measurement result weight displaying region 61 in sequence until the amount of fluctuation in weight Wt is determined to have become within the amount of fluctuation in weight for starting averaging W=(w+(6−n)L). After that, the average weight display determining portion 131c displays the eighth average weight X8t, which is calculated in the average weight storage controlling portion 31a, in the measurement result weight displaying region 61 in sequence when it is determined that the amount of fluctuation in weight Wt has become within the amount of fluctuation in weight for starting averaging (w+(6−n)L).

That is to say, the amount of fluctuation in weight for starting averaging W is less than in the case where "standard measurement mode" is selected, and therefore, the user has more chances to get results of measurement having good "response."

As described above, in the electronic balance 101 according to the present invention, the user can freely set the balance between the "stability" and the "response" according to their sense on the basis of the subjective stability and response when the user is measuring at the time when one measurement mode is selected from among "standard measurement mode" and gradual measurement mode," and the user of the electronic balance 1 "desires results of measurement having better response" than in the measurement mode at the time, or feels that "results of measurement having better stability are desirable because the environment for use is poor" during measurement in the selected measurement mode.

Other Embodiments (1) Though the above described electronic balance 1 has a configuration where the set number n is adjusted as the averaging parameter, the number of samples and the time during which stability continues may be adjusted in the configuration, and a number of averaging parameters may be adjusted in the configuration.

INDUSTRIAL APPLICABILITY

The present invention can be applied to an electronic balance where an appropriate measurement mode (conditions for display) can be selected for measurement in accordance with the situation in terms of the object to be measured, the measuring operation and the environment for operation.

The invention claimed is:
1. An electronic balance, comprising:
a measured weight storage controlling portion for controlling a detecting weight of an object in sequence and thus storing the detected measured weight in a measured weight storing portion in sequence;
a measuring mode storing portion for storing a number of measuring modes where different averaging parameters are preset;
an input portion for a measuring mode which carries out an input operation for selecting one measuring mode from among the number of measuring modes stored in said measuring mode storing portion; and an average weight display controlling portion for calculating average weight by averaging the number of measured weight stored in said measured weight storing portion on the basis of an average parameter in the selected measuring mode and displaying the average weight in a display portion, characterized in that the electronic balance further comprises an input portion for making a modification which carries out an input operation for making a modification in an average parameter in the selected measuring mode, and said average weight display controlling portion calculates the average weight by averaging a number of measured weight on the basis of the average parameter where a modification is made and displays the average weight in the display portion.

2. The electronic balance according to claim 1, characterized in that said averaging parameter is the number of samples which is the number of measured weight on which an averaging process is carried out, and said average weight display controlling portion improves the stability of the average weight to be displayed when such a modification is made that the number of samples increases using the number of samples in said selected measuring mode as a reference while improving the response of the average weight to be displayed when such a modification is made that the number of samples decreases using the number of samples in said selected measuring mode as a reference.

3. The electronic balance according to claim 1, characterized in that said average weight display controlling portion calculates a first average weight, which is a moving average of the measured weight of which the number of samples is the number of measured weight on which an averaging process is carried out, in sequence when measured weight is stored in said measured weight storing portion in sequence, and at the same time, stores the first average weight in the average weight storing portion in sequence, furthermore, calculates a second average weight, which is a moving average of the first average weight of said number of samples in sequence when the first average weight is stored in said average weight storing portion, in sequence, and at the same time, stores the second average weight in the average weight storing portion in sequence, and thus, calculates and stores the mth average weight in sequence, said averaging parameter has a corresponding set number m in order to display the mth average weight, and said average weight display controlling portion improves the stability of the average weight to be displayed when such a modification is made that the set number m increases using the set number m in said selected measuring mode as a reference while improving the response of the average weight to be displayed when such a modification is made that the set number m decreases using the set number m in said selected measuring mode as a reference.

4. The electronic balance according to claim 1, characterized in that the electronic balance further comprises a calculation portion for calculating the width of fluctuation which indicates chronographic change in the measured weight stored in said measured weight storing portion in sequence, said averaging parameter is a first threshold value of the width of fluctuation of the measured weight for determining whether or not a stable state has been gained, said average weight display controlling portion determines that a stable state has been gained when said width of fluctuation falls within the first threshold value and displays the average weight, which is the average measured weight of the number of samples, in the display portion and determines that a stable state has not been gained when said width of fluctuation is outside the first threshold value, and displays the average weight or the measured weight, which is the average measured weight of the number of samples that is smaller than the number of samples in said stable state, in the display portion, and when such a modification is made that the first threshold value increases using the first threshold value in said selected measured mode as a reference, it becomes easy to determine whether the state is stable, while when such a modification is made that the first threshold value decreases using the first threshold value of said selected measuring mode as a reference, it becomes difficult to determine whether the state is stable.

5. The electronic balance according to claim 1, characterized in that the electronic balance further comprises a calculation portion for calculating the width of fluctuation which indicates chronographic change in the measured weight stored in said measured weight storing portion in sequence, said averaging parameters are the first threshold value of the width of fluctuation in said measured weight for determining whether the state is stable and a second threshold value for the continuing time of the state where the width of fluctuation in said measured weight is the first threshold value or less, said average weight display controlling portion determines that the state is stable when the continuing time after said width of fluctuation becomes the first threshold value or less is longer than the second threshold value and displays the average weight, which is the average measured weight of the number of samples, in a display portion and determines that the state is not stable when the continuing time after said width of fluctuation becomes the first threshold value or less is not longer than the second threshold value, and displays the average weight or the measured weight, which is the average measured weight of the number of samples that is smaller than the number of samples in said stable state, and when such a modification is made that the second threshold value becomes shorter using the second threshold value in said selected measured mode as a reference, it becomes easy to determine whether the state is stable, while when such a modification is made that the second threshold value becomes longer using the second threshold value of said selected measuring mode as a reference, it becomes difficult to determine whether the state is stable.

6. The electronic balance according to claim 1, characterized by further comprising an averaging parameter display controlling portion for displaying an image indicating the averaging parameter where a modification has been made in the display portion.

7. The electronic balance according to claim 2, characterized by further comprising an averaging parameter display controlling portion for displaying an image indicating the averaging parameter where a modification has been made in the display portion.

8. The electronic balance according to claim 3, characterized by further comprising an averaging parameter display controlling portion for displaying an image indicating the averaging parameter where a modification has been made in the display portion.

9. The electronic balance according to claim 4, characterized by further comprising an averaging parameter display controlling portion for displaying an image indicating the averaging parameter where a modification has been made in the display portion.

10. The electronic balance according to claim 5, characterized by further comprising an averaging parameter display controlling portion for displaying an image indicating the averaging parameter where a modification has been made in the display portion.

* * * * *